United States Patent [19]

Fenoglio

[11] 4,305,329

[45] Dec. 15, 1981

[54] TURNTABLE OVEN

[76] Inventor: Bernard F. Fenoglio, 55 Evelyn Ter., South Amboy, N.J. 08879

[21] Appl. No.: 128,680

[22] Filed: Mar. 10, 1980

[51] Int. Cl.³ ............................................. A47J 37/06
[52] U.S. Cl. ........................................ 99/339; 99/343; 99/423; 126/41 A; 426/496; 432/142
[58] Field of Search .............. 126/41 A; 99/339, 386, 99/443 C, 389, 391, 393, 443 R, 443 C, 342, 343; 432/138, 142, 163, 198; 426/496

[56] References Cited

U.S. PATENT DOCUMENTS

| | | | |
|---|---|---|---|
| 1,731,743 | 10/1929 | Harrison | 126/41 A |
| 2,283,182 | 5/1942 | Carl | 99/339 |
| 2,372,362 | 3/1945 | Dawson | 126/41 A |
| 2,438,699 | 3/1948 | Groetchen | 99/423 |
| 2,566,524 | 9/1951 | Kammins | 99/339 |
| 3,425,364 | 2/1969 | Martin | 432/142 X |
| 3,604,338 | 9/1971 | Fiedler | 99/339 |
| 3,782,892 | 1/1974 | Johnson | 432/142 X |

*Primary Examiner*—Billy J. Wilhite
*Attorney, Agent, or Firm*—Alice L. Chen

[57] ABSTRACT

A gas-fired turntable oven for baking food such as pizza pies for fast food operations comprises a lower baking chamber and an upper holding chamber. Fresh pies are placed onto the turntable in the baking chamber and are baked to completion as they travel one revolution on the turntable. Partially baked pies having completed a predetermined fraction of a revolution on the turntable, may be removed from the baking chamber and kept warm in the holding chamber, to be later returned to the baking chamber and baked to completion while travelling the remaining fraction of a revolution on the turntable. This oven enables the cook to serve many pies in a short time during periods of peak demand.

9 Claims, 5 Drawing Figures

TURNTABLE OVEN

BACKGROUND OF THE INVENTION

This invention relates to a baking oven, and more particularly to an improved rotary baking oven for baking pizza pies.

There are four types of ovens currently being used for this purpose. These are stationary and rotary deck ovens, reel and conveyor ovens. The stationary deck oven provides the best baking conditions and complete flexibility but relies entirely on the skill, experience, and full attention of the operator to control the cooking time for each pie in the oven. A rotary deck oven as disclosed in U.S. Pat. No. 3,425,364 has a plurality of baking shelves mounted on a central flue pipe. U.S. Pat. No. 3,782,892 discloses a rotary oven with compartmented baking shelves and a compartmented heating system. Both rotary ovens normally rotate many times during the required cooking period and require the same skill, experience, and attention from the operator as the stationary oven. The principal advantage of the rotary deck ovens over the stationary ovens is compactness and ease of access to all parts of the cooking surface. Reel ovens operate functionally similar to the rotary deck oven except that the shelves are rectangular and are movably attached to the periphery of spokes as in a 'Ferris Wheel'. Reel ovens share basically the same advantages and disadvantages in operation as the rotary deck oven. The conveyor oven provides a preset constant baking time in that the pies are baked on the conveyor through a covered fired oven and are fully baked at the receiving end. Therefore it overcomes the principal disadvantage of constant attention by the cook as in the stationary and rotary deck oven. However, the capacity for cooking is limited. Establishments currently using these ovens produce pies in approximately ten to twenty minutes. None of the above mentioned ovens can produce fully cooked pies rapidly at times of peak demand. As a result, there is a need to invent an improved oven. The objective of this invention is to provide a compact and fast cooking oven requiring a minimum of supervision and skill. The oven, as described in detail hereinbelow, with a five foot diameter turntable, can produce one to two 10" pies per minute if operated according to the invention.

SUMMARY OF THE INVENTION

The oven in accordance with this invention comprises an upper holding chamber and a lower baking chamber separated by a top wall of the baking chamber. In the baking chamber, a turntable is rigidly fixed on the upper end of a first rotating shaft, thereby providing an unobstructed baking surface. The turntable rotates constantly at a speed such that it turns one revolution in the time needed to cook an unbaked pizza pie to completion. In the holding chamber, there is provided a holding table which is fixed at the center to the lower end of a second rotating shaft. Burners under the turntable in the baking chamber provide hot gas for baking. A portion of the hot gas rises from the baking chamber through a central opening of the top wall of the baking chamber thereby supplying heat to the holding chamber. A plurality of vertically spaced trays which can be stacked on one another are arranged on the periphery of the holding table for storing pies. The table is operated by an electric switch to turn in either direction so as to move any desired stack of trays to a door.

Fresh pies are placed onto the turntable in the baking chamber and may be baked to completion as they travel one revolution on the turntable.

Partially cooked pies may be removed from the turntable in the baking chamber after they have travelled a predetermined fraction of a revolution, stored in the holding chamber, and later returned to the baking chamber to be cooked to completion as they travel the remainder of a full revolution on the turntable, under a row of electrical heating elements.

This invention further includes a new process for cooking pies which comprises precooking fresh pies in the baking chamber, storing the precooked pies in the holding chamber and final cooking the precooked pies to completion in the baking chamber.

The invention will now be more fully described with specific reference to the accompanying drawings which illustrate a novel oven of this invention in one particular embodiment. It is to be understood, the drawings are simple exemplification of the idea of the invention, as many modifications of the invention are possible.

DETAILED DESCRIPTION OF THE PREFERRED EMBODIMENT

Figure 1:
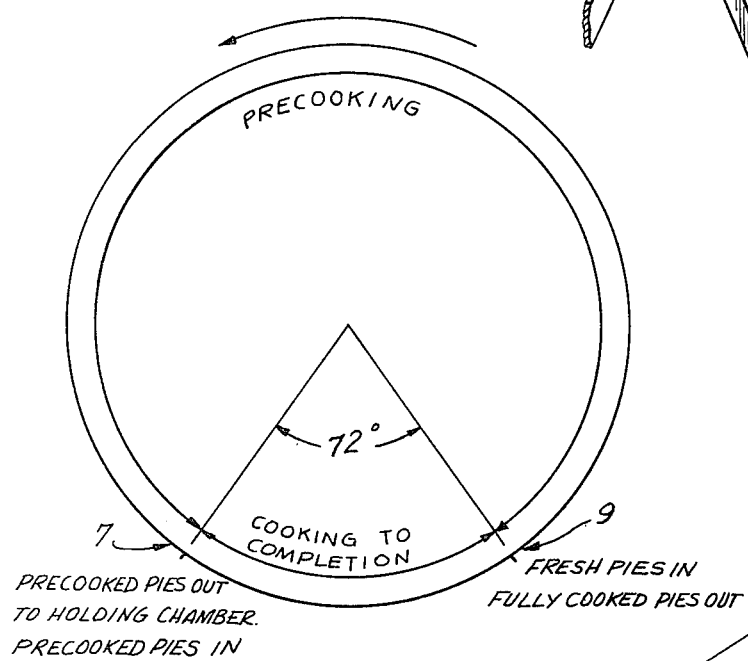
FIG. 1 shows the flow of pizza.

The improved turntable oven according to a preferred embodiment is described first with reference to FIG. 1 to illustrate the principle of the baking oven of this invention. It shows a plan view of the turntable in the baking chamber and the flow of pizza pies through the oven during operation.

Fresh pies are loaded onto the turntable at 9, the main door. The turntable rotates counterclockwise as shown by the arrow, at a rate of about one revolution per ten minutes. The pies travel on the turntable for example, for four-fifths of a full revolution, in about eight minutes, the time needed to precook the pies. At time of peak demand, the pies are left in the baking chamber for a final fifth revolution on the turntable, for about two more minutes, and returned to the main door, 9, at which time the pies are fully cooked and removed from the oven to be served. At times when the demand for pizza pies is slow, precooked pies are removed from the baking chamber at 7, the second door, and placed in a holding chamber to be kept warm. (not shown in FIG. 1) At times of peak demand, precooked pies in the holding chamber may be returned to the baking chamber at 7 to travel on the turntable for cooking to completion in approximately two minutes. The fully cooked pies are removed from the baking chamber at the main door 9.

Figure 2:
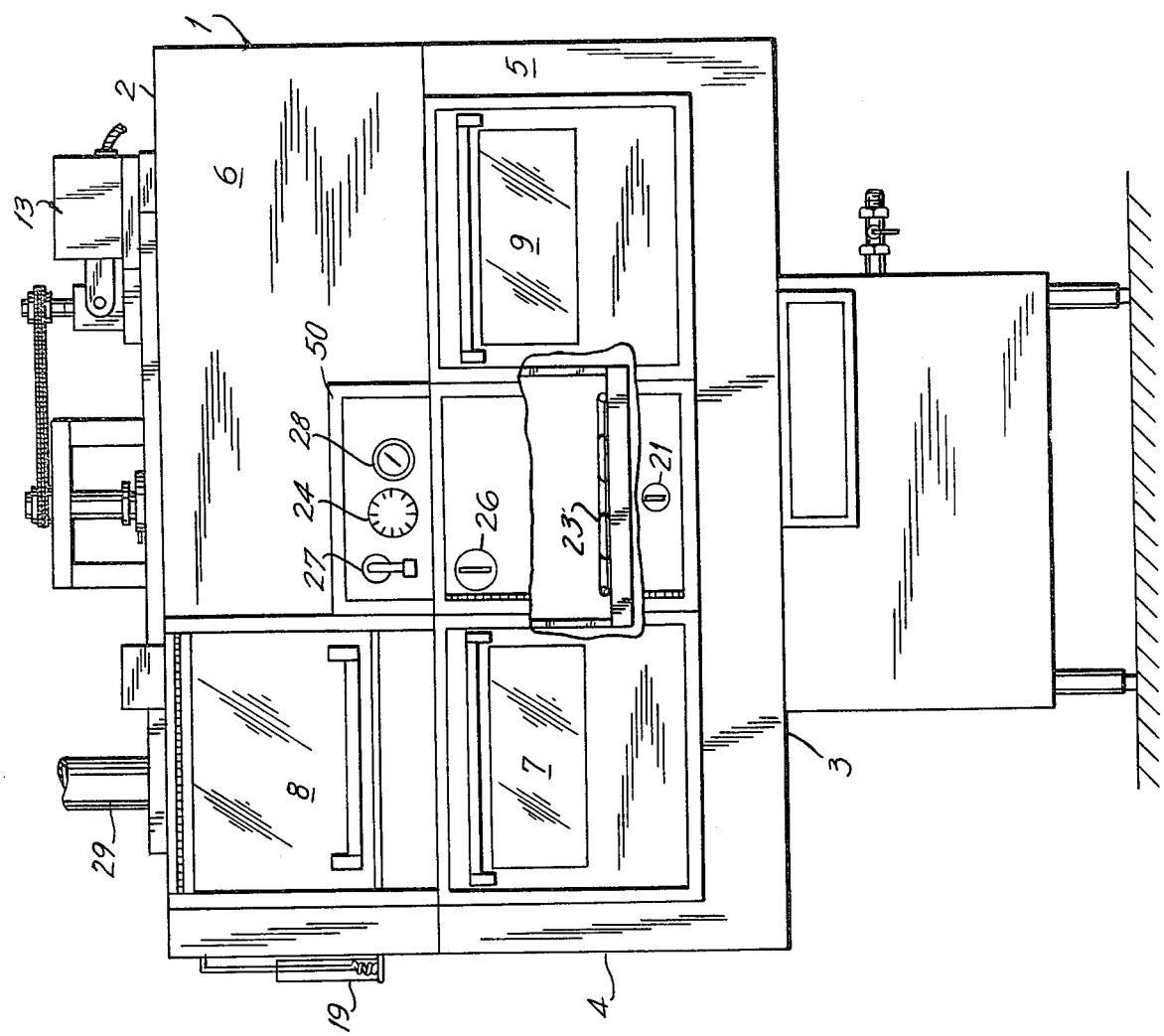
FIG. 2 shows the front view of the oven.
Figure 3:
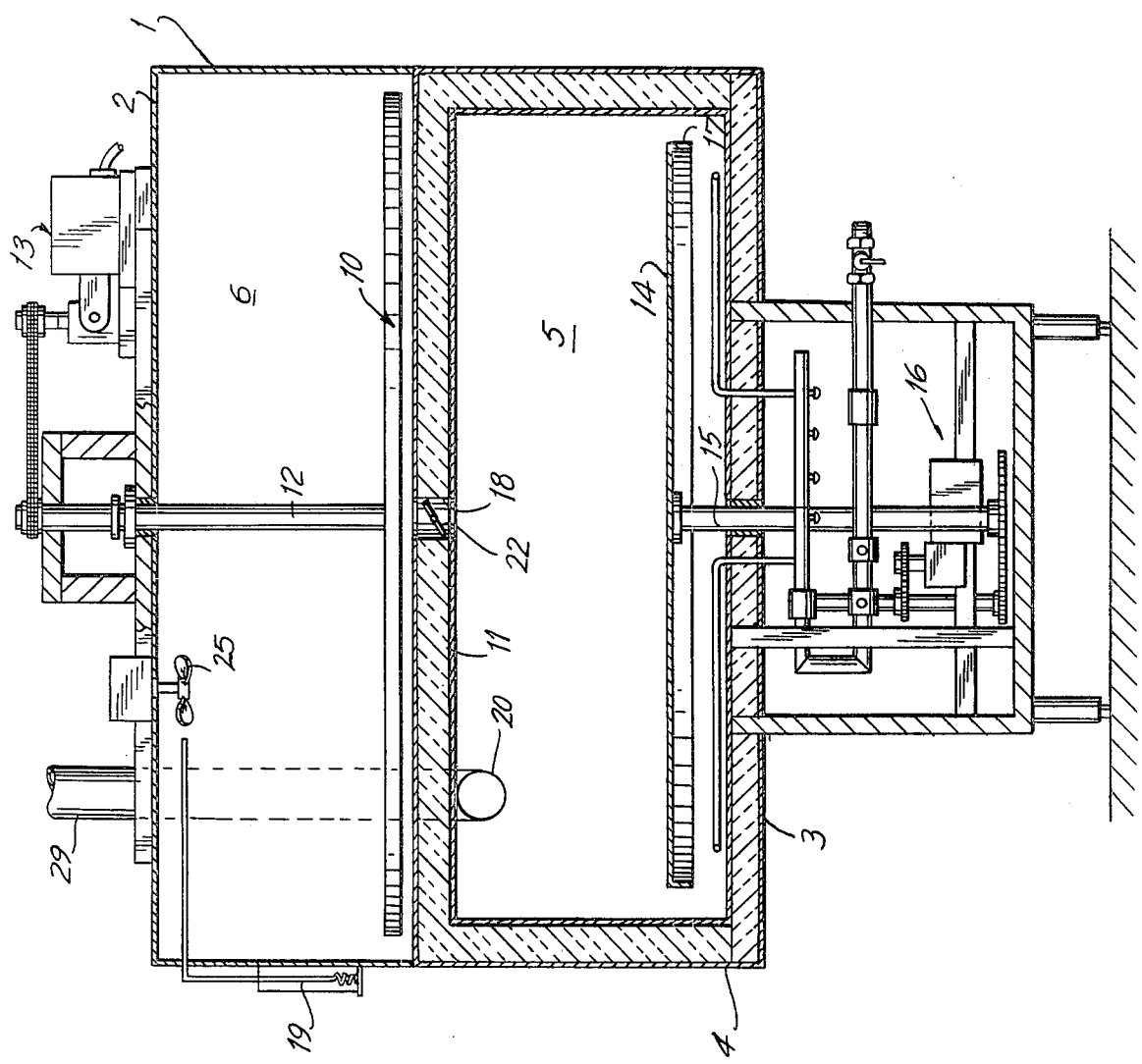
FIG. 3 is a cross-sectional view of the oven.

The invention is now described in terms of structure. Referring to FIGS. 2 and 3, the improved turntable oven according to a preferred embodiment comprises a lower baking chamber 5 having a housing defined by a lower cylindrical wall 4, and a bottom 3; and an upper holding chamber 6 having a housing defined by an upper cylindrical wall 1 and a flat roof 2. The two chambers are separated by a horizontal top wall 11 which defines a roof for the baking chamber. The top wall 11, has a central opening 18 which provides fluid communication between the two chambers. Both the lower cylindrical wall 4 and top wall 11 of the baking chamber consist of double shells with thermal insulation between them. Bottom 3 of the baking chamber is also insulated so as to preserve and confine heat in the baking chamber. The cylindrical wall 1 and the roof 2 are made of uninsulated sheet metal.

In the baking chamber, there is provided a horizontal circular turntable 14, supported by an angle iron 17, rigidly fixed at its center, on the underside, to the upper end of a vertical rotatable shaft 15 in such a way that the turntable baking surface is unobstructed. The turntable 14 is driven by an electric variable speed motor with a gear speed reducer and chain drive generally indicated as 16. Other means of driving the turntable may be employed so long as the components are heat resistant. The drive assembly 16 including gas inlet pipe are located below the baking chamber.

In accordance with the preferred embodiment of this invention, the turntable rotates once in about ten minutes, the time needed to bake the pies to completion. The diameter of the turntable is about 45 inches to 70 inches, preferable 60 inches. The turntable is preferably made of steel sheet metal, although other material such as ceramic tile, brick or wire mesh supported on a frame can also be used. Several burners (not shown) connected to the gas inlet pipe are evenly distributed in the space between the bottom 3 of the baking chamber and the turntable 14. They generate hot gas controlled between 400°-600° F. by a thermostat 26. It is to be noted that the temperature in the baking chamber should be sufficiently high to bake the pies to completion at the selected time for the turntable to make one revolution. Therefore, the time of cooking, i.e. the time for one revolution of the turntable and the temperature and the pie thickness are all interrelated; a temperature between 400° and 600° F. will be sufficient to bake the pies of about ½" thickness in ten minutes. These examples are for illustration only. The baking time can be varied in accordance with the baking temperature and is not limited to ten minutes. These baking conditions are known to those skilled in the art, and no further details in this respect are deemed necessary for a complete understanding of the invention. It is to be understood that the words baking and cooking are used herein interchangeably throughout.

In the holding chamber 6, there is provided a holding table 10 of approximately the same diameter as the turntable. It is rigidly fixed at the center of the upper side of the table to the lower end of a second rotatable shaft 12. The second shaft 12 is driven by a similar drive assembly 13 as the one used for driving shaft 15 in the baking chamber. This assembly 13 is preferably located above the roof 2. The holding table 10 is operated by an electric switch 27 located on an instrument and control panel 50 which is fixed on the outside of the cylindrical walls 1 and 4. The holding table can be rotated in either direction so that any part of the table can be moved opposite a door 8.

Referring to FIG. 2, at the right of panel 50, a main door 9 is provided on wall 4 of the baking chamber for loading unbaked pies and also for unloading fully baked pies. A second door 7 is located on the left of the panel 50. The second door is located at such a position that the longer distance between the doors 7 and 9 travelled by the turntable provides sufficient time for precooking fresh pies, and the remaining shorter distance between the doors 7 and 9 travelled by the turntable provides sufficient time for final baking of the precooked pies. In accordance with a preferred embodiment, the shorter distance between the doors 7 and 9 corresponds to at least one-fifth of a revolution of the turntable. A third door 8 is located in the holding chamber directly above the second door 7 for convenient transfer of pies between the two chambers.

It is to be understood that the separation between the doors 7 and 9 and the speed of the turntable are selected so as to provide the best precooking and finishing time for the type of pies which is popular among the patrons of the pizzeria.

The positions of the doors have been described for counterclockwise rotation of the turntable; they would be reversed for clockwise rotation of the turntable.

Figure 4:
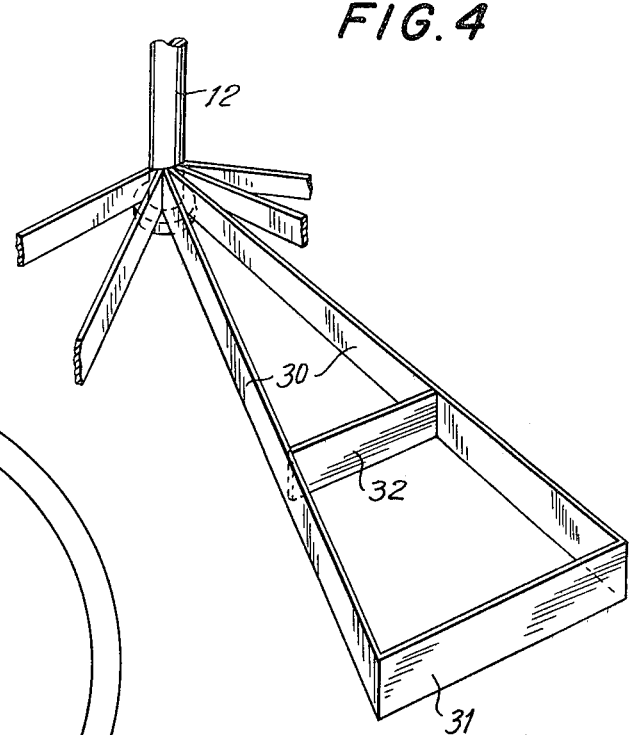
FIG. 4 shows the tray supporter connected to the rotatable shaft.

On the upper side of the holding table 10, there is provided a tray support structure as shown in FIG. 4. A plurality of spoke-like metal strips 30 radiates from the shaft 12 forming sectors each having an outer arc of about 16". Cross bracing members 31 and 32 connecting the adjacent spokes form a rigid lattice frame for supporting trays to be described hereinbelow.

Figure 5:
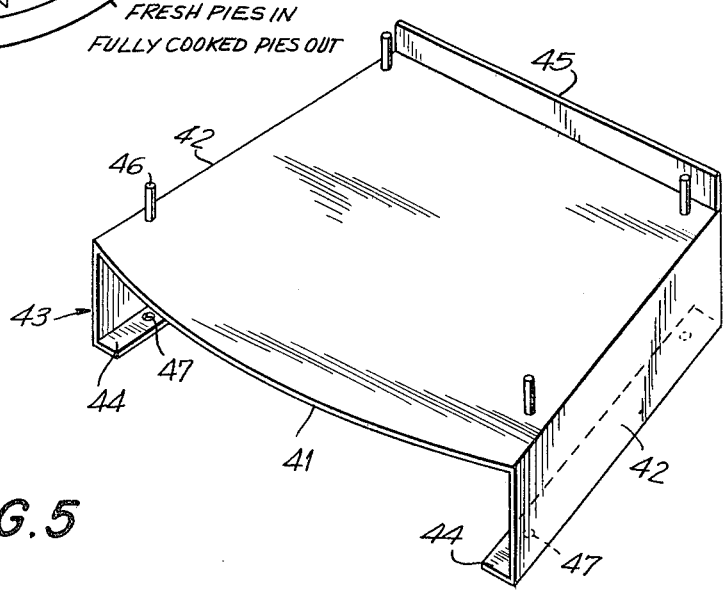
FIG. 5 is a detailed view of a single tray.

As shown in FIG. 5, a tray for storing a precooked pie is made of sheet metal in the general shape of an outer portion of a sector so as to fit onto the lattice frame as shown in FIG. 4. The arc edge 41 should have the same curvature as the holding table or the support frame and be about 16" wide. The sides 42 of the tray are bent downward, serving as legs 43 and further bent toward each other forming lips 44. The sides of the tray 42 are about 12" deep. The back edge 45 is turned upward to prevent the pies from falling onto the holding table 10. This back edge 45 is about 10" wide. It is to be understood that these dimensions are intended for pies of 10" diameter, which is a customary size. The holding tray can be designed for pies of different size and shape. On the face of the tray, there are fixed four pegs 46, one at each corner. Corresponding to the positions of the pegs, four holes 47 are provided on the two lips to receive the pegs of the tray placed therebelow. In this manner, the trays can be stacked on top of one another, up to the height of the door opening 8. At least four trays may be stacked on top of one another. The trays are easy to clean and assemble. Each stack of trays can be taken out as a unit.

As shown in FIG. 2, on the instrument and control panel 50, there is provided a thermostat 28 for control of the temperature in the holding chamber. The thermostat in connection with a relay and solenoid actuates a butterfly valve 22 shown in FIG. 3, pivotally mounted in an opening 18 on the top wall 11 of the baking chamber, through which opening the two chambers are in fluid communication. Thus the temperature of the holding chamber is regulated in that when the temperature varies from the preset reading, the butterfly valve will close or shut the gas flow from the baking chamber. Switch 27 as described hereinabove is for turning the holding table 10 in either direction for ease of access to the pies stored on trays. In addition, a humidity meter 24 for monitoring the humidity of the holding chamber is provided. Humidity must be maintained so that the pies will not dry out during storage in the holding chamber. The humidity meter signal is amplified and transmitted to operate steam generator 19, located outside the holding chamber to supply steam to the holding chamber. The steam is introduced through a tube in the vicinity of a fan 25 supported from the roof for distributing steam throughout the chamber. The fan further circulates warm air to maintain uniform temperature and humidity throughout the chamber.

On the panel there is also thermostat 26 for controlling the baking temperature, and a thermostat 21 for controlling the temperature of a heating element, an electric coil 23 suspended above the turntable behind the panel. The heating element, 23 provides intense cooking of precooked pies to completion. The heating element can be an additional gas burner or an electric radiant heater. The heating element may be affixed on the wall 4 and supported from top wall 11, extending horizontally from the wall to the center of and above the turntable, such that pies will be cooked to completion in about two minutes while travelling from the second door 7 to the main door 9.

In operation, the hot combustion gas from the burner flows around the edge of the turntable and cooks the pies placed thereon. Part of the flue gas rises from the baking chamber through the centrally located opening 18 to the holding chamber above and heats and controls the temperature of the holding chamber over a range of 140°–200° F. This heating arrangement is preferred as it is economical and practical. Other means for heating the hold chamber such as electric heat, or conducting hot gas through an outside conduit or others can also be used but not preferred. Fresh pies placed on the turntable at main door 9 can be removed from the second door 7 and stored in holding chamber at third door 8, for later use or the precooked pies can be left on the turntable for cooking to completion and returned to the main door. Waste flue gas leaves the holding chamber through vent 29 and the remaining part of the flue gas from the baking chamber leaves through vent 20.

The turntable of 60″ diameter constantly turns at a rate of one revolution per ten minutes or about 18″ per minute at the periphery. This will afford an operator ample time after loading unbaked pies at the main door 9 to prepare the next pie or to remove precooked pie at the second door 7 and to set it on the tray in the holding chamber or to transfer pies from the holding chamber at the third door 8 to the baking chamber at the second door 7 and then remove fully cooked pie at the main door 9. The operator merely recovers pies as they arrive at the main door or the second door without having to inspect the pies to see whether they are done. This is possible only because the cooking time has been carefully correlated with the temperature of the baking and with the thickness of the pies. Thiuniform quality and simplified operation.

It is apparent that this novel oven comprises many improved features in a single compact unit. The invented method consisting of precooking pies, storing and cooking to completion enables an unskilled cook to meet peak demand by customers without sacrifice in cooking quality.

Numerous modification and variations of the present invention are possible in light of the above teaching and therefore, the invention may be otherwise than as particularly described.

I claim:

1. A turntable oven for baking pies having a lower baking chamber, an upper holding chamber, said chambers being in fluid communication therebetween, a heater supplying hot gas to the baking chamber, at least one horizontal turntable in the baking chamber supported for rotation on a verticle shaft and means for rotating the turntable, the improvement comprising a first door to the baking chamber for loading fresh pies and unloading fully cooked pies; a second door for removal of precooked pies to the holding chamber and the return of precooked pies to the baking chamber; the longer distance between the two doors travelled by the turntable providing sufficient time for precooking fresh pies; and the remaining shorter distance between the two doors travelled by the turntable providing sufficient time for final cooking of the precooked pies; and a third door in the holding chamber located above the second door in the baking chamber for storing and removal of precooked pies.

2. An improved oven according to claim 1 wherein the short distance between the doors corresponds at least one-fifth of a revolution of the turntable.

3. An improved oven according to claim 1 further comprising:
   a holding table in the holding chamber, rigidly attached to a second rotatable shaft,
   a plurality of stackable trays removably mounted on the table for storing precooked pies,
   means for rotating said holding table to the third door for access to the desired tray.

4. An improved oven according to claim 1 further comprising heating means in the baking chamber extending from its housing and positioned over the turntable in such a way that precooked pies placed at the second door are cooked to completion while travelling through the shorter distance between the first and second door.

5. An improved oven according to 4, wherein the heating means is an electric coil.

6. A turntable oven according to claim 1 wherein the turntable is securely attached on the underside to the upper end of the shaft thereby providing an unobstructed baking surface, said turntable rotating one full revolution in the time needed to bake the pies to completion.

7. A turntable oven according to claim 1 further comprising means for monitoring humidity in the holding chamber.

8. A turntable oven according to claim 7 further comprising means for circulating air in the holding chamber.

9. In a turntable oven having a first housing defining a baking chamber, a heater supplying hot gas to the baking chamber, at least one horizontal turntable in the baking chamber supported for rotation on a vertical shaft and means for rotating the turntable around the first shaft, the improvement comprising:
   a holding chamber defined by a second housing and a horizontal wall above the baking chamber,
   a holding table supported at the lower end of a second rotatable shaft for providing support to a plurality of vertically spaced trays for storing precooked pies,
   the horizontal wall having a central opening, through which hot gas flows from baking chamber to holding chamber,
   said baking chamber having a first door for loading fresh pies and unloading fully cooked pies; and a second door for transferring precooked pies to the holding chamber or vice versa, the second door being located at a distance from the first door such that the longer distance between the two doors provides sufficient time for precooking fresh pies and the remaining shorter distance between the two doors provides sufficient time for final cooking of the precooked pies and a third door in the holding chamber above the second door
means for rotating the holding table for access to desired trays and,
heating means supported from the horizontal wall above the turntable, located within the shorter distance between the two doors, for cooking the precooked pies to completion.

* * * * *